(12) United States Patent
Nakamura et al.

(10) Patent No.: US 9,115,418 B2
(45) Date of Patent: Aug. 25, 2015

(54) METHOD OF RECOVERING PLATINUM GROUP ELEMENTS

(75) Inventors: Yuzuru Nakamura, Chiyoda-Ku (JP); Minoru Kawasaki, Chiyoda-Ku (JP); Katsunori Yamaguchi, Morioka (JP); Tetsuya Ueda, Ichikawa (JP); Keiko Ishizaki, Ichikawa (JP)

(73) Assignees: TANAKA KIKINZOKU KOGYO K.K., Tokyo (JP); DOWA METALS & MINING CO., LTD., Tokyo (JP)

( * ) Notice: Subject to any disclaimer, the term of this patent is extended or adjusted under 35 U.S.C. 154(b) by 188 days.

(21) Appl. No.: 14/004,334

(22) PCT Filed: Mar. 7, 2012

(86) PCT No.: PCT/JP2012/055813
§ 371 (c)(1),
(2), (4) Date: Nov. 20, 2013

(87) PCT Pub. No.: WO2012/124565
PCT Pub. Date: Sep. 20, 2012

(65) Prior Publication Data
US 2014/0150608 A1    Jun. 5, 2014

(30) Foreign Application Priority Data
Mar. 11, 2011    (JP) .................. 2011-053664

(51) Int. Cl.
*C22B 11/02* (2006.01)
*C22B 11/00* (2006.01)

(52) U.S. Cl.
CPC ............... *C22B 11/02* (2013.01); *C22B 11/021* (2013.01)

(58) Field of Classification Search
CPC ........................... C22B 11/02; C22B 11/0021
See application file for complete search history.

(56) References Cited

U.S. PATENT DOCUMENTS

| 4,451,290 | A  | * | 5/1984 | Hill et al. ........................ 75/631 |
| 2005/0166707 | A1 | * | 8/2005 | Yamada et al. .............. 75/10.62 |
| 2009/0071289 | A1 | * | 3/2009 | Fekete et al. ................. 75/10.19 |
| 2012/0118108 | A1 | * | 5/2012 | Dobbelaere et al. ........... 75/631 |
| 2013/0180363 | A1 | * | 7/2013 | Nakamoto et al. ............. 75/631 |

FOREIGN PATENT DOCUMENTS

| JP | A-2004-068071 | 3/2004 |
| JP | A-2004-275866 | 10/2004 |
| JP | A-2004-277791 | 10/2004 |
| JP | A-2004-277792 | 10/2004 |
| JP | A-2005-054201 | 3/2005 |
| JP | A-2008-001917 | 1/2008 |
| JP | A-2009-024263 | 2/2009 |
| JP | A-2011-149052 | 8/2011 |

OTHER PUBLICATIONS

International Search Report issued in Application No. PCT/JP2012/055813; Dated Jun. 5, 2012 (With Translation).

* cited by examiner

*Primary Examiner* — George Wyszomierski
*Assistant Examiner* — Tima M McGuthry Banks
(74) *Attorney, Agent, or Firm* — Oliff PLC

(57) ABSTRACT

Provided is a method of unevenly distributing a specific element in a copper phase out of platinum group elements that exist in the copper phase, including further adding copper into a molten copper phase containing the platinum group elements including at least rhodium, thereby increasing a distribution ratio of rhodium in the molten copper phase.

12 Claims, 13 Drawing Sheets

(a)

(b)

METHOD OF RECOVERING PLATINUM GROUP ELEMENTS

TECHNICAL FIELD

The present invention relates to a method of recovering platinum group elements, and particularly relates to the method of recovering platinum group elements from a metal copper containing the platinum group elements.

DESCRIPTION OF RELATED ART

Conventionally, a method such as a pyrometallurgy process is known, which is the process of recovering metal copper from copper oxide (mainly $Cu_2O$) being a useful copper resource. Such a pyrometallurgy process is specifically described as follows.

First, a copper oxide-containing substance, and a flux having a function of mainly decreasing a reaction temperature, and a reducing agent, are melted in a melting furnace, to thereby make a slag. Then, by utilizing a reducing reaction that occurs in this slag, metal copper is generated from the copper oxide. The metal copper thus generated, is heavier than a specific gravity of the slag, and is sunk in the slag. Thus, by utilizing a specific gravity difference between the generated metal copper and the slag, the metal copper is separated and recovered from the slag. Such a pyrometallurgy process is known.

The pyrometallurgy process is characterized in that when a metal copper phase, which is generated by being reduced, is dropped in the slag, each kind of element having a higher melting degree than that of the metal copper, is also dropped under influence of the copper phase. Actually, as a result of analyzing the copper phase accumulated in a bottom phase of the slag, it is found that each kind of element that is supposed to exist in the slag, is melted in the copper phase.

Thus, the pyrometallurgy process can be utilized as a method of recovering each kind of element in the copper phase with high yield. An example of this technique is as follows. The pyrometallurgy process is utilized as a method of recovering platinum group elements (also called "PGM" hereafter) for example, from an automobile exhaust emission purification catalyst used for a used diesel particulate filter (DPF), by charging this catalyst into a molten copper (for example, see patent documents 1 to 5).

Note that in this specification, PGM indicates any one of the six elements of ruthenium (Ru), rhodium (Rh), palladium (Pd), osmium (Os), iridium (Ir), and platinum (Pt), or a combination of them. Further, of course there is also a case that gold (Au) or the other metal is recovered in addition to PGM. However, in this specification, PGM is taken as an example for the convenience of the explanation.

PRIOR ART DOCUMENT

Patent Document

Patent document 1: Japanese Patent Laid Open Publication No. 2004-68071
Patent document 2: Japanese Patent Laid Open Publication No. 2004-275866
Patent document 3: Japanese Patent Laid Open Publication No. 2004-277791
Patent document 4: Japanese Patent Laid Open Publication No. 2004-277792
Patent document 5: Japanese Patent Laid Open Publication No. 2009-24263

SUMMARY OF THE INVENTION

Solution to the Problem

The above-mentioned method is surely extremely useful as a method of recovering PGM as one group. Meanwhile, when the pyrometallurgy process is used, the knowledge regarding a method of recovering a specific element from PGM, has not been obtained yet in a case of the pyrometallurgy process.

A case of selecting Pd, Pt, and Rh out of PGM, and recovering them collectively, is assumed as the case requiring the above-mentioned method, namely, as "the case requiring the recovery of the specific element from PGM".

Pd, Pt, and Rh out of PGM, are frequently used and are expensive elements in the PGM. Therefore, when Pd, Pt, and Rh are recovered, it is ideal that only Pd, Pt, and Rh are contained in the copper phase. If reversely described, it is preferable that there is less content of the other PGM (Ru, Os, and Ir). In this case, a division of labor of "recovering PGM contained in the copper phase" and "recovering Pd, Pt, and Rh out of the PGM" can be smoothly performed, and such a divisional labor contributes to an efficiency of the recovery of the PGM. Further, needs for recovering Pd, Pt, and Rh can be sufficiently satisfied, for a person who has the labor of recovering PGM.

Such needs are generated in the present progressive form. Therefore, a subject of "recovering a specific element from PGM" itself is not known in a field of the present invention. Accordingly, at present, in the case of using the pyrometallurgy process, the method of recovering the specific element from PGM has not been known yet.

Therefore, an object of the present invention is to provide the method of recovering the specific element from PGM, with the specific element unevenly distributed in the PGM that exists in the copper phase.

Solution to the Problem

As a result of studying on a method of achieving the above-mentioned object, and as a result of reexamining a mechanism of melting PGM in a copper phase, it is reconfirmed by inventors of the present invention, that Ru, Os, and Ir out of PGM, are hardly melted in the copper phase. It is also reconfirmed that for the reason that Ru, Os, and Ir are hardly melted in the copper phase, the following mechanism is utilized: namely, these elements are precipitated in a bottom phase of the copper phase, rather than melting these elements.

Based on the reconfirmation described above, it is found by the inventors of the present invention, that by (1) further adding PGM itself, or (2) further adding copper (Cu), or (3) further adding manganese (Mn), finally, the specific element in the PGM, particularly at least one of the elements in the group of (Pd, Pt, and Rh), and at least one of the elements in the group of (Ru, Os, and Ir), can be separately unevenly distributed in an upper phase or a bottom phase of the copper phase. A specific gravity of each metal of the present invention is Ir (22.7 $g/cm^3$), Os (22.6 $g/cm^3$), Pt (21.5 $g/cm^3$), Rh (12.5 $g/cm^3$), Ru (12.4 $g/cm^3$), Pd (12.0 $g/cm^3$), Cu (8.9 $g/cm^3$), and Mn (7.5 $g/cm^3$), in an order of a high value.

Based on this knowledge, aspects of the present invention are as follows.

According to a first aspect of the present invention, there is provided a method of recovering platinum group elements, including:

further adding copper into a molten copper phase containing platinum group elements including at least rhodium, thereby increasing a distribution ratio of rhodium in the molten copper phase.

According to a second aspect of the present invention, there is provided a method of recovering platinum group elements, including:

adding iridium into a molten copper phase containing platinum group elements including at least rhodium, thereby increasing a distribution ratio of the rhodium in the molten copper phase.

According to a third aspect of the present invention, there is provided a method of recovering platinum group elements, including:

adding manganese into a molten copper phase containing platinum group elements including at least rhodium, thereby increasing a distribution ratio of the rhodium in the molten copper phase.

According to a fourth aspect of the present invention, there is provided a method of recovering platinum group elements, including:

adding manganese into a molten copper phase containing platinum group elements including rhodium and at least one of platinum and palladium, thereby increasing a distribution ratio of the rhodium in the molten copper phase.

According to a fifth aspect of the present invention, there is provided the method of recovering platinum group elements according to the first aspect, including:

further adding iridium into the molten copper phase, thereby increasing the distribution ratio of rhodium in the molten copper phase.

According to a sixth aspect of the present invention, there is provided the method of recovering platinum group elements according to the first aspect, including:

further adding manganese into the molten copper phase, thereby increasing the distribution ratio of rhodium in the molten copper phase.

According to a seventh aspect of the present invention, there is provided the method of any one of the first, second, and fifth aspects, wherein the recovered platinum group element is rhodium.

According to an eighth aspect of the present invention, there is provided the method of any one of the third, fourth, and sixth aspects, wherein the recovered platinum group element is rhodium and at least one of platinum, and palladium.

Advantage of the Invention

According to the present invention, a method of recovering a specific element from PGM can be provided, with the specific element out of PGM that exists in a copper phase unevenly distributed in the copper phase.

BRIEF DESCRIPTION OF THE DRAWINGS

FIG. 2(a) shows a result in the case of 1 hour, FIG. 2(b) shows a result in the case of 3 hours, FIG. 2(c) shows the result in the case of 12 hours, and FIG. 2(d) shows the result in the case of 24 hours.

FIG. 4 is a view showing the relation between mass % of the elements in the upper phase and the bottom phase, and the melting time, regarding the sample for analysis composed of the metal copper used in this example, wherein FIG. 4(a) shows the result in the upper phase, and FIG. 4(b) shows the result in the bottom phase.

FIG. 6(a) shows the result in the case of 1 hour, and FIG. 6(b) shows the result in the case of 3 hours.

FIG. 7(a) shows the result in the case of 1 hour, and FIG. 7(b) shows the result in the case of 3 hours.

FIG. 8(a) shows the result in the case of 1 hour, and FIG. 8(b) indicates the result in the case of 3 hours.

FIG. 9(a) shows the result in the case of 1 hour, and FIG. 9(b) shows the result in the case of 3 hours.

FIG. 13 is a view showing the element analysis result in the upper phase and the bottom phase, when the horizontal axis indicates the mass % of Mn in the upper phase, regarding the sample into which 20 mass % of Mn is added in this example, wherein FIG. 13(a) shows the result in the upper phase, and FIG. 13(b) shows the result in the bottom phase.

MODES FOR CARRYING OUT THE INVENTION

Figure 1:
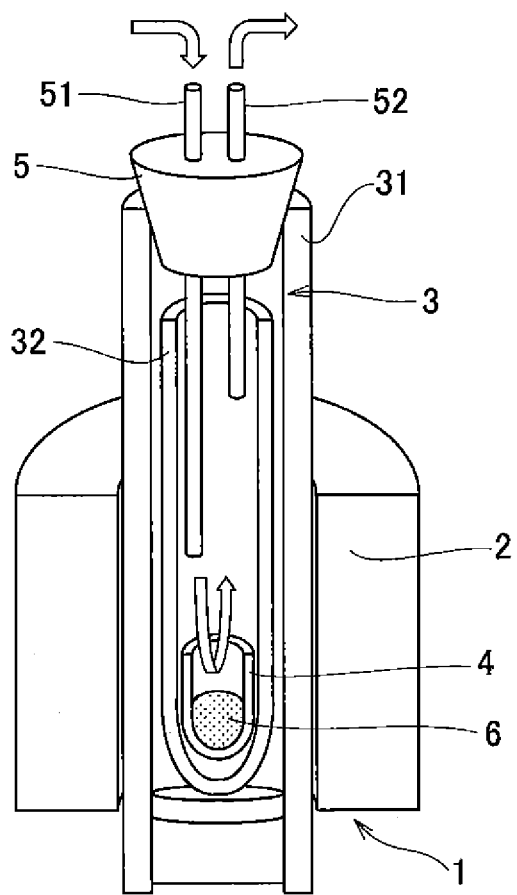
FIG. 1 is a sectional schematic view showing a melting furnace used in this example.

In order to solve the above-described problem on the assumption that the pyrometallurgy process is performed in the embodiment of the present invention, explanation is given for each technique described below such as:
(1) further adding PGM itself, or
(2) further adding copper (Cu), or
(3) further adding manganese (Mn),
in embodiments 1 to 3.
Explanation is also given for a modified example, in embodiment 4.

Embodiment 1

In this embodiment, explanation is given for the technique of (1) further adding PGM itself. The explanation is given in the following order.
A) Preparing a melting furnace
B) melting a metal copper
C) Charging iridium (Ir)
D) Melting/cooling treatment
E) Other process
F) Effect by this embodiment A) Preparing a Melting Furnace In this embodiment, explanation is given for a case that a melting furnace is used, as shown in a sectional schematic view of FIG. 1. A melting furnace 1 of this embodiment has an electric furnace 2 composed of a heat generator made of molybdenum disilicide ($MoSi_2$); a reaction tube 3 covered with the electric furnace 2; and a crucible 4 made of magnesium oxide (MgO) covered with the reaction tube 3. The reaction tube 3 has a double structure of an outside tube 31 and an inside tube 32, wherein the crucible 4 is provided on the inside tube 32, for allowing a molten copper phase 6 to exist therein.

A tip en of the reaction tube 3 is opened, and a gas introducing part 5 is fitted into the outside tube 31 for sucking/exhausting a gas for cooling the melting furnace 1. A suction part 51 for sucking the gas into the reaction tube 3, and an exhaust part 52 for exhausting the gas, are provided in the gas introducing part 5. The suction part 51 and the exhaust part 52 are formed into tubular shapes, so that a gas storage part (not shown) or an outside air outside of the reaction tube 3, and an inside of the inside tube 32 are communicated with each other. Then, in order to speedily cool the molten copper phase 6, the tip end of the suction part 51 in the inside tube 32 is arranged closer to the crucible 4 than the tip end of the exhaust part 52 in the same inside tube 32.

B) Melting Metal Copper

The metal copper generated in a middle of the method of recovering PGM described in patent document 5 (Japanese Patent Laid Open Publication No. 2009-24263) is used as the metal copper used in this embodiment. Note that the method of recovering PGM described in patent document 5, is the method called a "ROSE process". The ROSE process is briefly described as follows.

Namely, a treated member containing PGM, and a copper source material containing copper oxide, are charged into a sealed electric furnace together with a flux component and a reducing agent. Then, reducing and smelting are performed to the charged substances.

Then, a molten metal mainly composed of metal copper is precipitated in a lower part of a molten slag phase mainly composed of oxide. A mixed molten body (liquid phase) of a molten oxide after oxidation treatment and the molten copper phase in the melting furnace 1, is set still in the furnace. As a result, the molten oxide after oxidation treatment has a smaller specific gravity than that of the molten copper phase, thus being easily separated into an upper phase of the molten oxide and a bottom phase of the molten copper phase. Thus, PGM is concentrated in the molten metal which is precipitated in the lower part.

Thereafter, the molten copper phase in which PGM is concentrated, is separated from the molten slag, and is transferred to another furnace in a molten state. Then, by performing oxidation and smelting to the molten copper phase in another furnace, the molten copper phase is separated into a slag phase mainly composed of oxide and a molten copper phase in which PGM is further concentrated. Thereafter, by repeating this process, PGM is concentrated and contained in the molten copper phase, thereby recovering PGM. Such a method is provided.

In this embodiment, the above-mentioned oxidation treatment is repeated twice, and the metal copper obtained after second oxidation treatment is used. This metal copper is melted using the above-mentioned melting furnace 1, to thereby form a melted copper phase.

Further, a PGM recovering apparatus described in patent document 5 may be used as the apparatus for performing a recovering method of this embodiment.

C) Charge of Iridium (Ir)

In this embodiment, Ir is added into the melted copper phase. Thus, a distribution ratio of Rh can be improved compared with the distribution ratio before adding Ir, in the upper phase of the metal copper obtained finally after a melting treatment.

The "upper phase" in this specification, indicates a layer at the side in contact with a vapor phase of a plurality of phases in the metal copper formed by melting treatment/cooling treatment (described later) performed to the metal copper. Of course, the "plurality of phases" may be two phases or more in this embodiment. If at least a part of the elements of (Ru, Os, and Ir) can be unevenly distributed relatively in the bottom phase side, and at least a part of the elements of (Pd, Pt, and Rh) can be unevenly distributed relatively at the upper phase side by utilizing a fact that the specific gravity of Rh is lighter than the specific gravity of Ir, a technical concept of this embodiment can be applied.

Further, if Rh is taken as an example, the "distribution ratio" in this specification, indicates a value expressed by a ratio of mass % of Rh (also called content, and called concentration in some cases) in a certain phase, and a mass % of Rh in the other phase, when a plurality of phases are formed in the copper phase. When a plurality of phases are the upper phase and the bottom phase, specific equation is as follows.

$$L_x^{u/b} = (\text{mass \% of element } X \text{ in the upper phase})/(\text{mass \% of element } X \text{ in the bottom phase})$$

When Rh is taken as an example as described above, Rh is expressed by $L_{Rh}^{u/b}$.

At present, strenuous efforts have been made by the inventors of the present invention, regarding a mechanism of improving the distribution ratio. The mechanism can be estimated as follows. Namely, Ir has a high specific gravity in the PGM, and usually a plurality of Ir exit in the bottom phase of the molten copper phase. Namely, even if a plurality of Ir exist in the upper phase of the molten copper phase during charge of Ir, Ir move to the bottom phase during melting treatment. In this case, Ru and Os which are relatively similar to Ir in the characteristic of the element (such as atomic weight and specific gravity, etc.) also move to the bottom phase, accompanied by the move of Ir. As a result, content of Ru, Os, and Ir is reduced and content of Rh (concentration) is increased in the upper phase of the copper phase. From the above result, it is found that at least the distribution ratio of Rh is improved.

Ir is preferably added into the molten copper phase by the amount exceeding 1 mass % and not more than 10 mass %, and further preferably added into the molten copper phase by 5 mass % or more and 10 mass % or less. As will be described in an example, the distribution ratio of Rh can be increased, and also the distribution ratio of Pt, Pd, and Rh can be increased, compared with a case before adding Ir.

D) Melting Treatment/Cooling Treatment

The melting treatment is performed using the above-mentioned melting furnace 1. A treatment temperature at this time may be set to the temperature at which PGM can be melted in the copper phase, and for example, 1300° C. or more treatment temperature is acceptable.

Further, a cooling method for ending the above-mentioned melting treatment can be given in C) preparing the melting furnace, and for example, the molten copper phase in the crucible 4 may be cooled by introducing an inert gas such as an argon (Ar) gas into the melting furnace 1.

By performing the above-mentioned melting treatment and cooling treatment, a plurality of phases are formed according to the specific gravity of the element in the copper phase. In this embodiment, Rh content is increased in the upper phase of the plurality of phases, and the distribution ratio of Rh which is frequently used in the PGM in the molten copper phase can be increased compared with the distribution ratio before mixture. As a result, Rh can be suitably recovered as a platinum metal element to be recovered.

E) the Other Step

Au or PGM can be further sorted and recovered by various melting methods or a publicly-known method such as an electrolytic method, from the melting copper phase containing PGM obtained by this embodiment.

F) Effect by this Embodiment

According to this embodiment, the following effect can be exhibited. Explanation is given for a specific ground for the effect in this example (described later).

In recent years, there is a need for obtaining the copper phase having a large content of Pd, Pt, and Rh in the PGM. According to this embodiment, a special effect of improving the distribution ratio of Rh in the copper phase can be exhibited by adding Ir into the molten copper phase, which is originally not preferable to be contained in the molten copper phase. Namely, Rh in the PGM that exist in the molten copper phase, can be unevenly distributed in the copper phase.

As a result, the specific element (Rh) can be recovered from the PGM. In addition, the division of labor of "recovering PGM contained in the copper phase" and "recovering Pd, Pt, and Rh out of the PGM" can be smoothly performed, and such a divisional labor contributes to the efficiency of the recovery of the PGM. Further, the need for recovering Pd, Pt, and Rh can be sufficiently satisfied, for a person who has the labor of recovering PGM.

Embodiment 2

In this embodiment, explanation is given for (2) the technique of further adding copper (Cu). Note that a different point from the embodiment 1 in the above-mentioned explanation contents A) to F) is a part of C) charge of Ir. Namely, in this embodiment, "C) Further charge of Cu" is described as Order C). The part excluding this content and the content described below, is the same as the embodiment 1, and therefore explanation is omitted.

In this embodiment, Cu is further added into the melted copper phase. Thus, the distribution ratio of Rh can be improved, compared with the distribution ratio before further mixture of Cu in the copper phase obtained finally after the melting treatment, similarly to the embodiment 1.

At present, strenuous efforts have been made by the inventors of the present invention, regarding the mechanism of improving the distribution ratio. The mechanism can be estimated as follows. Namely, Cu has a low specific gravity compared with the whole body of the PGM, and a plurality of Cu exist in the upper phase relatively in the molten copper phase, and the characteristic of the element of Cu is relatively similar in the PGM, compared with Pt, Pd, and Rh which are required now. Accordingly, Pt, Pd, and Rh are unevenly distributed in the upper phase together with Cu. Then, the contents of Ru, Os, and Ir are decreased, and the content of Rh is relatively increased in the upper phase of the copper phase. Further, Pt, Pd, and Rh are extracted from the bottom phase to the upper phase by further adding Cu, and the contents of Pt, Pd, and Rh are increased in the upper phase of the copper phase. As a result, the distribution ratio of at least Rh is improved, and consequently Rh can be suitably recovered as the PGM to be recovered.

The amount of added Cu can be selected whenever the need arises, depending on the uneven distribution of each element of the PGM in the upper phase or the bottom phase. For example, 50 mass % of Cu may be added into the molten copper phase. At least in this case, the distribution ratio of Au can be increased compared with the distribution ratio before mixing Cu.

Embodiment 3

In this embodiment, explanation is given for (3) the technique of further adding manganese (Mn). Note that the different point from the embodiment 1 in the above-mentioned explanation contents A) to F) is a part of C) charge of Ir. Namely, in this embodiment, "C) charge of Mn" is described as Order C). The part excluding this content and the content described below, is the same as the embodiment 1, and therefore explanation is omitted.

In this embodiment, Mn is added into the melted copper phase. Thus, the distribution ratio of Rh can be improved similarly to the embodiment 1 compared with the distribution ratio before mixing Mn in the copper phase obtained finally after the melting treatment. Further, the distribution ratio of Pt, Pd, and Au can also be improved compared with the distribution ratio before mixing Mn.

Further, by adding Mn, the distribution ratio of Pt, Pd, and Rh can be decreased compared with the distribution ratio before mixing Mn, in a precipitation phase composed of a precipitate generated in the copper phase. Namely, Pt, Pd, and Rh which are particularly required to be recovered, are not allowed to be contained in the precipitation phase in which Ru, Os, and Ir are accumulated, which have a high specific gravity in the PGM and are hardly melted in the copper phase. As a result, the effect of embodiment 1 can be further enhanced.

Note that the "precipitation phase" called here, is the phase generated by precipitation, because Ru, Os, and Ir are hardly melted in the copper phase as described above.

At present, strenuous efforts have been made by the inventors of the present invention, regarding the mechanism of improving the distribution ratio. The mechanism can be estimated as follows. Namely, Mn has a high specific gravity compared with the whole body of the PGM, and usually a plurality of Mn exit relatively in the upper phase of the molten copper phase. Then, the characteristic of the element of Mn is relatively similar in PGM, compared with Pt, Pd, and Rh which are required now. Accordingly, Pt, Pd, and Rh are unevenly distributed in the upper phase together with Mn. Then, the contents of Ru, Os, and Ir are decreased, and the content of Rh is increased relatively in the upper phase of the copper phase. Further, Pt, Pd, and Rh are extracted from the bottom phase to the upper phase by adding Mn, and the contents of Pt, Pd, and Rh are increased in the upper phase of the copper phase. As a result, the distribution ratio of Pt, Pd, and Rh is improved, and consequently Pt or Pd, and further at least one of the Pt and Pd can be suitably recovered in addition to Rh, as the PGM to be recovered.

The amount of added Mn can be suitably selected whenever the need arises, depending on the uneven distribution of each element of the PGM in the upper phase or the bottom phase. For example, 20 mass % of Mn may be added into the molten copper phase. At least in this case, the distribution ratio of Au can be increased compared with the distribution ratio before mixing Mn.

Embodiment 4

A technical range of the present invention is not limited to the above-mentioned embodiment, and includes various modifications and improvements, in a range capable of deriving a specific effect obtained by the constituting features of the invention and a combination thereof.

In this embodiment, the melting furnace 1 is described as a simple furnace. However, a revolving furnace or a rotary furnace may also be used. By tilting or rotating the furnace as needed, contact/mixture of the substances described in embodiments 1 to 3 and the molten copper phase can be accelerated.

The metal copper which is a base of the molten copper used as described above, is not limited in purity, and the metal copper, of course may contain PGM and also may contain Au, and the above-mentioned method of recovering PGM can be applied to Au. Further, the metal copper can be used without inconveniency even if impurities such as iron (Fe) and chromium (Cr) are contained therein.

Further, in embodiment 1, by adding Ir, the distribution ratio of Rh is improved in the copper phase. However, it can also be considered that Pd is added instead of Ir. In the case of adding Pd, there is a possibility that the distribution ratio of the elements of any one of Pt, Pd, and Rh or the combination of them, is improved in the copper phase.

Further, PGM recovered in embodiment 3 may be Pt or Pd, and further at least one of the Pt and Pd.

In addition, embodiments 1 and 3 may be further applied, based on the embodiment 2 (technique of further adding copper (Cu)).

Specifically, by adding Cu into the molten copper phase, Ir is further added, to thereby increase the distribution ratio of Rh in the molten copper phase. As a result, Rh can be suitably recovered as the platinum-group element to be recovered.

Further, similarly, by adding Cu into the molten copper phase, manganese is further added, to thereby increase the distribution ratio of Rh, Pt, or Pd in the molten copper phase. As a result, Pt or Pd, and further at least one of Pt and Pd can be suitably recovered in addition to Rh, as the platinum-group element to be recovered.

EXAMPLE

Example 1

In this example, as described in embodiment 1, explanation is given for the case of (1) further adding (Ir) of PGM itself.

A) Preparation of the Melting Furnace

In this example, the metal copper and Ir described below are mixed and melted, using the melting furnace shown in FIG. 1.

B) Melting of the Metal Copper

In this example, the oxidation treatment was repeated twice in the ROSE process described in patent document 5 (Japanese Patent Laid Open Publication No. 2009-24263), and the metal copper obtained after the second oxidation treatment was used. The characteristic of the metal copper was analyzed before performing a test using the metal copper in an example thereafter.

Figure 2:
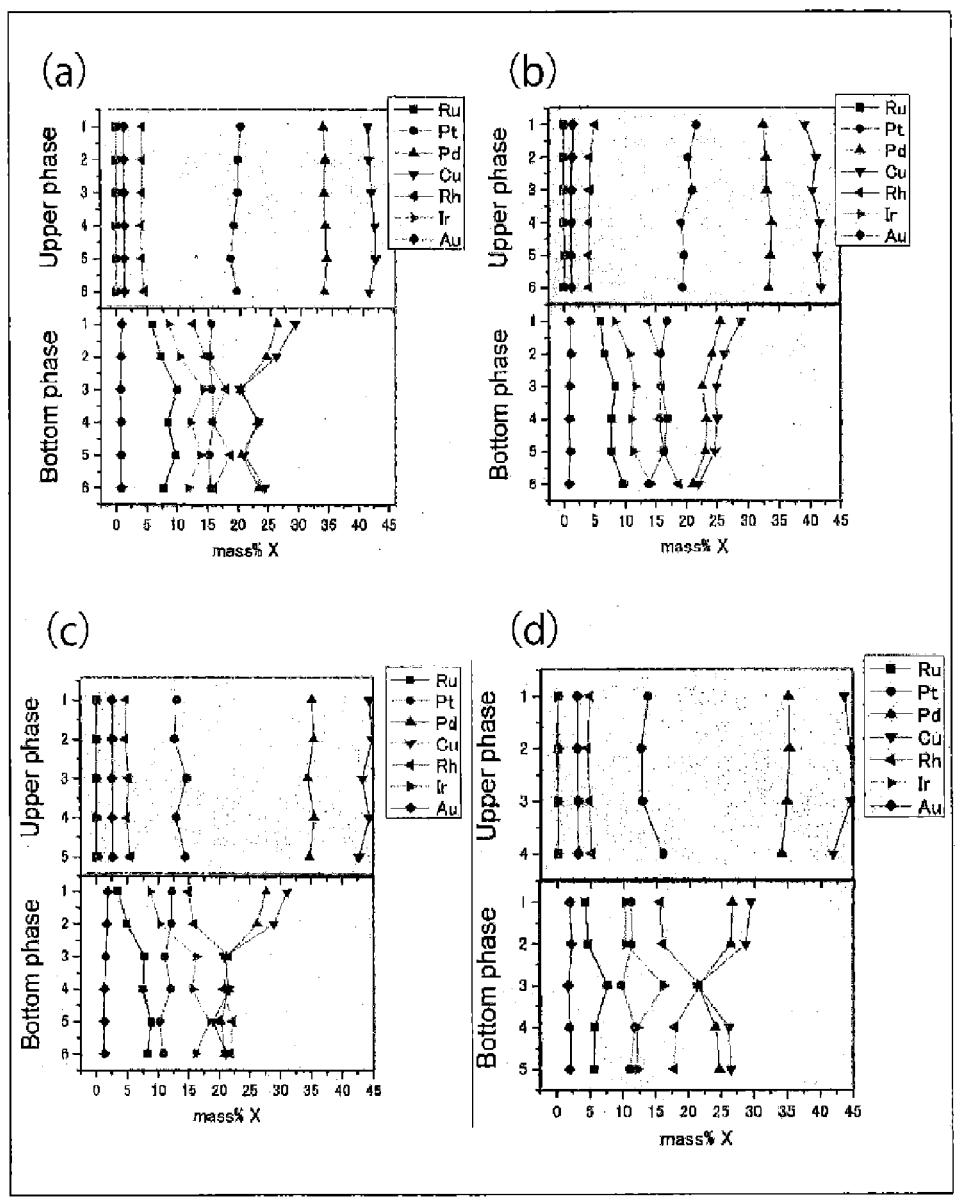
FIG. 2 is a view showing an element analysis result in an upper phase and a bottom phase, regarding a sample for analysis composed of a metal copper used in this example, wherein, the vertical axis indicates a depth from an outermost surface of a copper phase, and a horizontal axis indicates mass % of the element. In addition, the vertical axis indicates a depth obtained by dividing the depth into equal parts in each phase (for example, value "3" taken on the vertical axis of the upper phase of FIG. 2(a) indicates a depth point of 3/6 from the outermost surface in the whole body of the upper phase). Further.

First, a plurality of samples of the metal copper 11.0 g were prepared in the crucible 4 of the melting furnace 1 of FIG. 1, and each sample was heated at 1300° C. for 1 hour, 3 hours, 12 hours, and 24 hours. An atmosphere at this time was an atmospheric air. Ar gas was introduced from the suction part 51 of the gas introducing part 5 after the melting treatment, to thereby fabricate an analyzing sample of the metal copper before the test. FIG. 2(a) shows a result in the case of 1 hour, FIG. 2(b) shows a result in the case of 3 hours, FIG. 2(c) shows the result in the case of 12 hours, and FIG. 2(d) shows the result in the case of 24 hours. The vertical axis indicates a depth from an outermost surface of the copper phase, and the horizontal axis indicates the mass % of the element. Note that the vertical axis indicates the depth in the case of dividing the depth into equal parts in each phase. For example, the value "3" of the vertical axis of the upper phase of FIG. 2(a) indicates a depth point of 3/6 from the outermost surface in the whole body of the upper phase.

In this example and the example thereafter, an EPMA apparatus (JXA-8500F) produced by Japan Electron Optics Laboratory) was used for analysis of the element.

Figure 3:
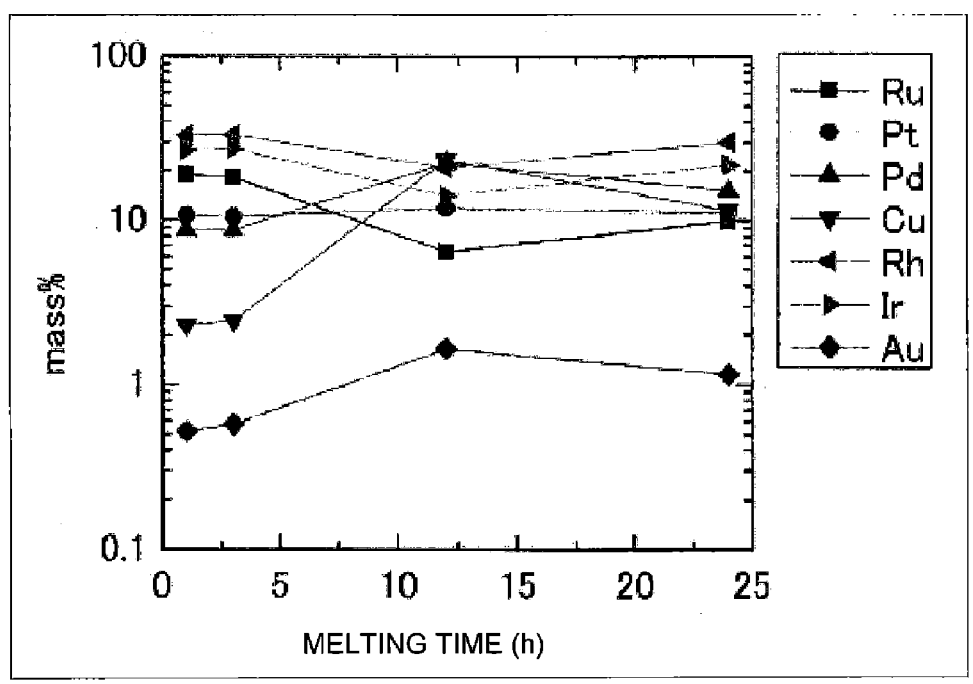
FIG. 3 is a view showing a relation between mass % of an element in a precipitation phase (solid phase), and a melting time, regarding the sample for analysis composed of the metal copper used in this example.

Further, FIG. 3 and table 1 show the relation between the mass % of the element in the precipitation phase (solid phase) and the melting time, regarding the analyzing sample of the metal copper fabricated as described above.

TABLE 1

| Melting time (h) | Mass % in precipitation phase (solid phase) | | | | | | |
|---|---|---|---|---|---|---|---|
| | Rh | Pt | Pd | Cu | Au | Ru | Ir |
| 1 | 32.60 | 10.59 | 8.63 | 2.27 | 0.52 | 18.84 | 26.54 |
| 3 | 32.79 | 10.41 | 8.62 | 2.42 | 0.57 | 18.24 | 26.96 |

TABLE 1-continued

| Melting time (h) | Mass % in precipitation phase (solid phase) | | | | | | |
|---|---|---|---|---|---|---|---|
| | Rh | Pt | Pd | Cu | Au | Ru | Ir |
| 12 | 20.72 | 11.83 | 22.15 | 23.14 | 1.65 | 6.42 | 14.09 |
| 24 | 29.62 | 11.00 | 15.12 | 11.40 | 1.15 | 9.95 | 21.77 |

Figure 4:
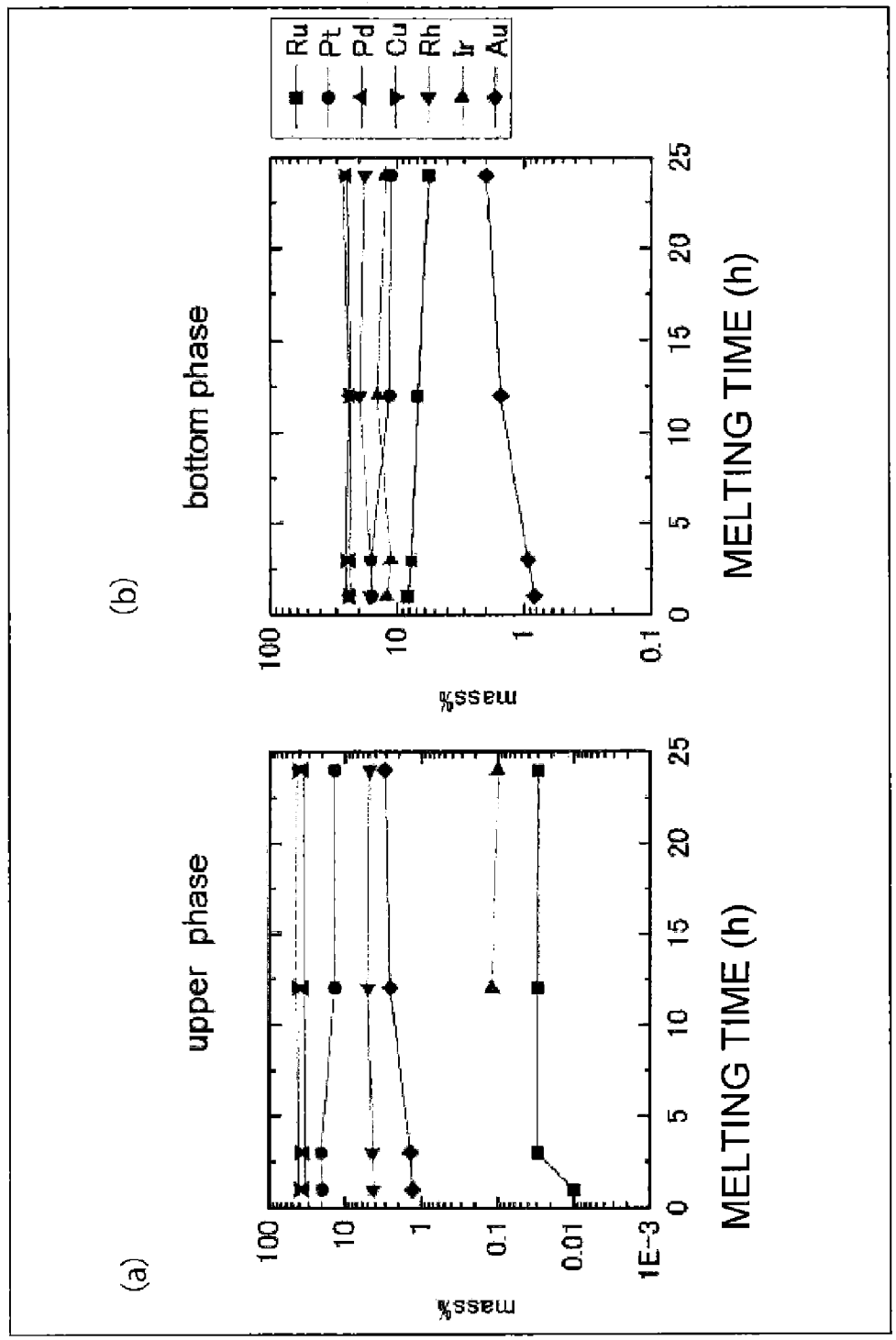

Further, the analyzing sample of the metal copper fabricated as described above, is divided into both phases of the upper phase and the bottom phase, and regarding the relation between the mass % of the element and the melting time in both phases, FIG. 4(a) shows the upper phase, and FIG. 4(b) shows the bottom phase.

Figure 5:
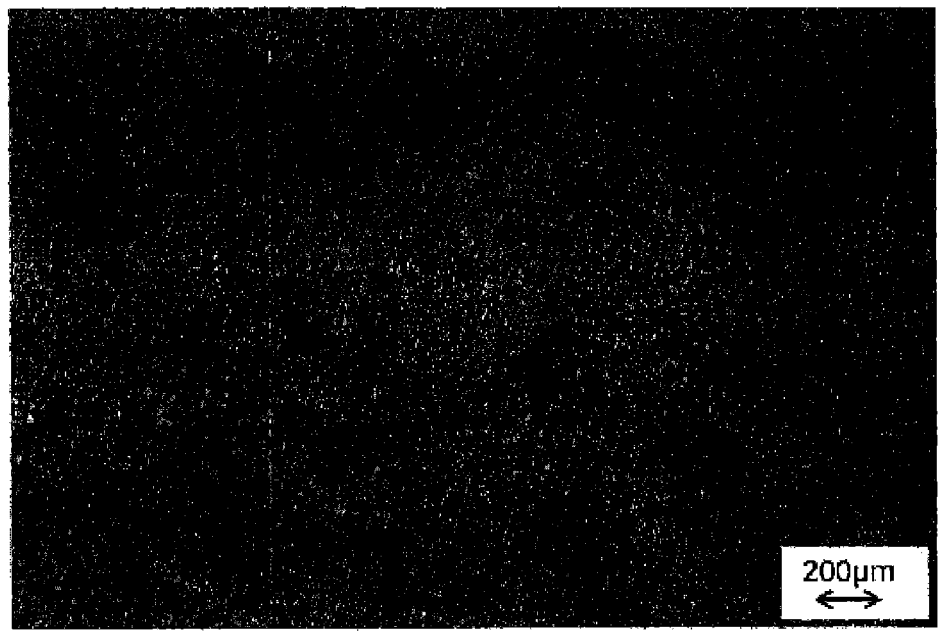
FIG. 5(a) is a view showing the result obtained by observing the sample for analysis composed of the metal copper used in this example, using an optical microscope.
FIG. 5(b) is a view showing the result obtained by performing analysis using an electron beam microanalyzer, regarding the sample for analysis composed of the metal copper used in this example.
Figure 5:
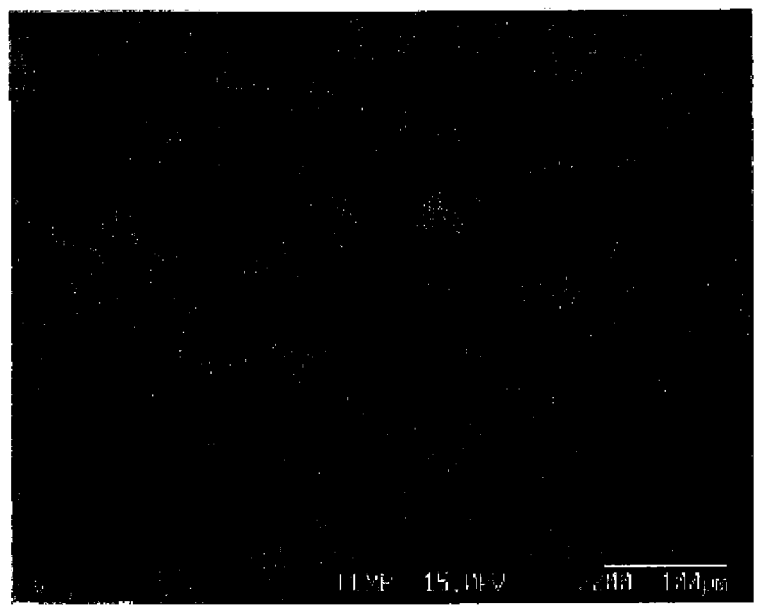

The metal copper before the test in this example was observed by an optical microscope. The result thereof is shown in FIG. 5(a). As shown in FIG. 5(a), as a pre-test state, the solid phase which is turned into the precipitation phase when being precipitated, was uniformly dispersed in the copper phase, and a segregation of the solid phase could not be observed.

imilarly to the observation by the optical microscope, the metal copper of this example in the pre-test state, was observed by an electron probe micro analyzer (EPMA). The result thereof is shown in FIG. 5(b). The element was analyzed for each color of the EPMA. The result thereof is shown in table 2.

TABLE 2

| Color of photograph | mass % | | | | | | |
|---|---|---|---|---|---|---|---|
| | Rh | Pt | Pd | Cu | Au | Ru | Ir |
| White color | 40.775 | 4.309 | 6.248 | 3.835 | 0.400 | 11.523 | 32.909 |
| Gray color | 5.428 | 14.699 | 32.375 | 42.716 | 4.528 | 0.055 | 0.199 |
| Black color | 0.185 | 0 | 0.426 | 98.726 | 0.055 | 0.512 | 0.096 |

C) Charge of Ir

In this example, Ir was mixed into the melted metal copper as described above. A mixture amount in this case was set to 1 mass %, 5 mass %, and 10 mass %, in each of the plurality of molten copper phases.

D) Melting Treatment/Cooling Treatment

Thereafter, the melting treatment was performed at 1300° C. for 1 hour or 3 hours. In this case, the sample was fabricated in each melting time.

Thereafter, the electric furnace 2 was stopped, and the Ar gas from the suction part 51 of the gas introducing part 5 was sprayed from the surface of the molten copper phase 6, to thereby speedily cool the sample. Thus, the melting treatment and the cooling treatment were ended.

Figure 6:
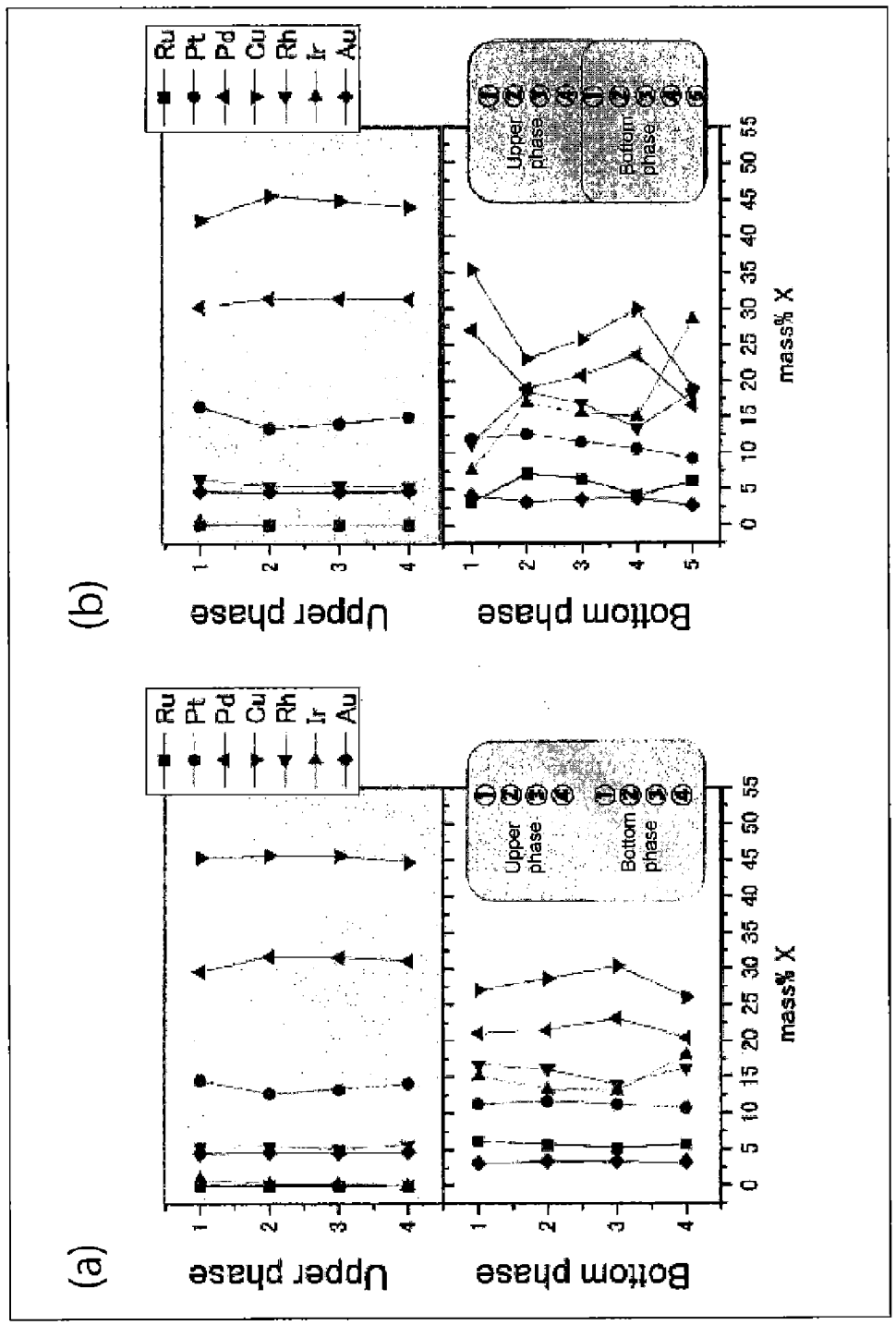
FIG. 6 is a view showing an element analysis result in the upper phase and the bottom phase, regarding a sample into which 1 mass % of Ir is added in this example, wherein the vertical axis indicates the depth from the outermost surface of the copper phase, and the horizontal axis indicates the mass % of the element. Further.

As described above, the sample in this example was fabricated. Similarly to the copper phase before the test, this sample was also divided into the upper phase and the bottom phase, and the element in both phases was analyzed. FIG. 6 shows 1 mass % case. The vertical axis indicates the depth from the outermost surface of the copper phase, and the horizontal axis indicates the mass % of the element. FIG. 6(a) shows the case that the melting time is set to 1 hour, and FIG. 6(b) shows the case that the melting time is set to 3 hours. Similarly, FIG. 7(a) and FIG. 7(b) show 5 mass % case, and similarly, FIG. 8(a) and FIG. 8(b) show 10 mass % case. Further, the relation between the distribution ratio of each element ($L_x^{u/b}$=(mass % of the element X in the upper phase)/(mass % of the element X in the bottom phase)) and the mixing amount of Ir, is shown in table 3 (melting time: 1 hour) and table 4 (melting time: 3 hours).

TABLE 3

| Ir addition amount (mass %) | $L_x^{u/b}$ | | | | | | |
|---|---|---|---|---|---|---|---|
| | Rh | Pt | Pd | Cu | Au | Ru | Ir |
| 0% | 0.26 | 1.25 | 1.46 | 1.71 | 1.56 | 0.0013 | 0.0004 |
| 1% | 0.33 | 1.22 | 1.44 | 1.62 | 1.40 | 0.0037 | 0.022 |
| 5% | 0.43 | 1.35 | 1.58 | 1.76 | 1.60 | 0.0001 | 0.008 |
| 10% | 0.33 | 1.30 | 1.55 | 1.74 | 1.55 | <0.0001 | 0.014 |

TABLE 4

| Ir addition amount (mass %) | $L_x^{u/b}$ | | | | | | |
|---|---|---|---|---|---|---|---|
| | Rh | Pt | Pd | Cu | Au | Ru | Ir |
| 0% | 0.27 | 1.28 | 1.43 | 1.62 | 1.46 | 0.0043 | <0.001 |
| 1% | 0.36 | 1.32 | 1.45 | 1.65 | 1.38 | 0.0076 | 0.008 |
| 5% | 0.29 | 1.30 | 1.70 | 2.01 | 1.70 | 0.0050 | 0.005 |
| 10% | 0.41 | 1.35 | 1.57 | 1.75 | 1.58 | 0.0035 | 0.014 |

Figure 7:
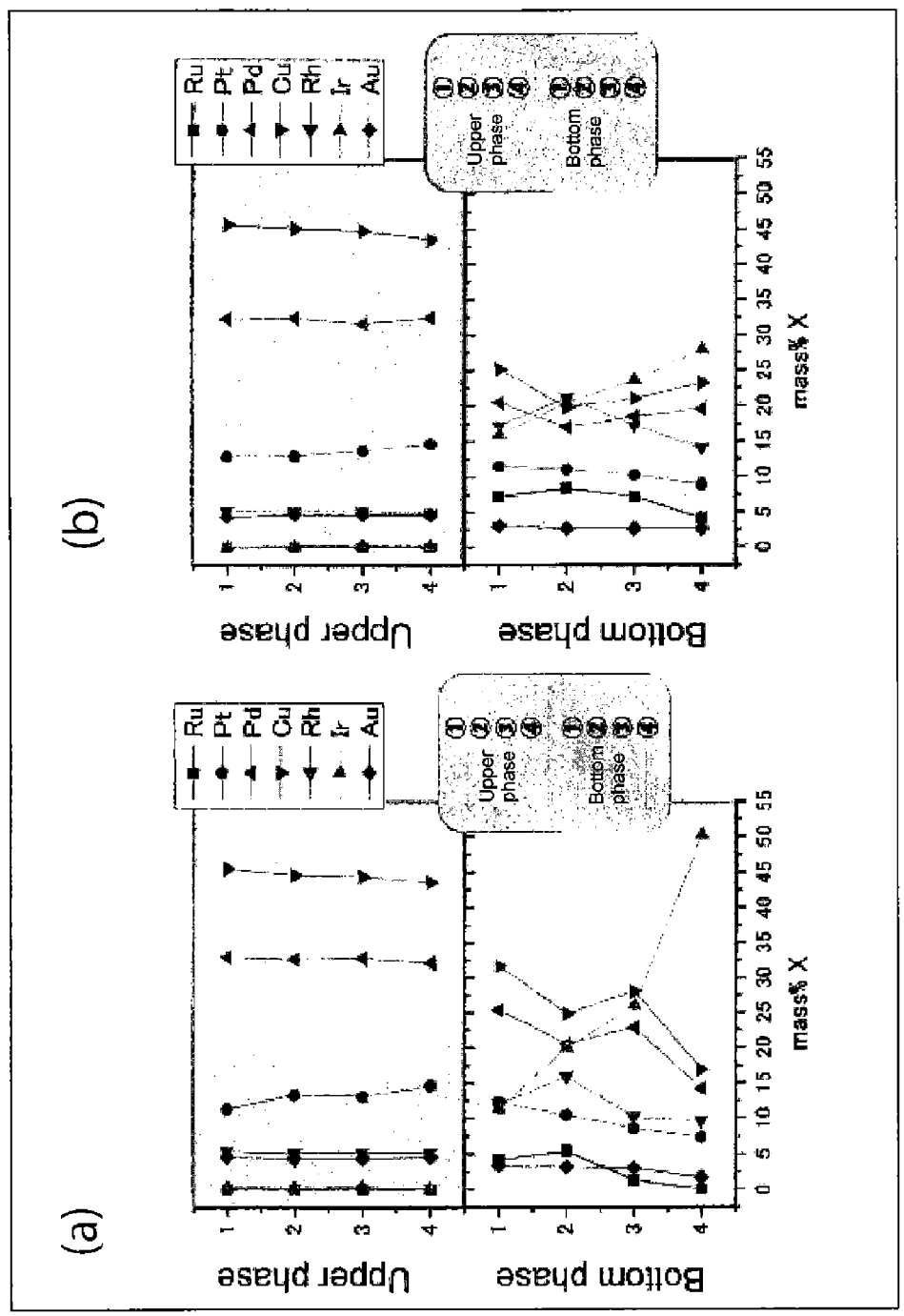
FIG. 7 is a view showing the element analysis result in the upper phase and the bottom phase, regarding the sample into which 5 mass % of Ir is added in this example, wherein the vertical axis indicates the depth from the outermost surface of the copper phase, and the horizontal axis indicates the mass % of the element. Further.
Figure 8:
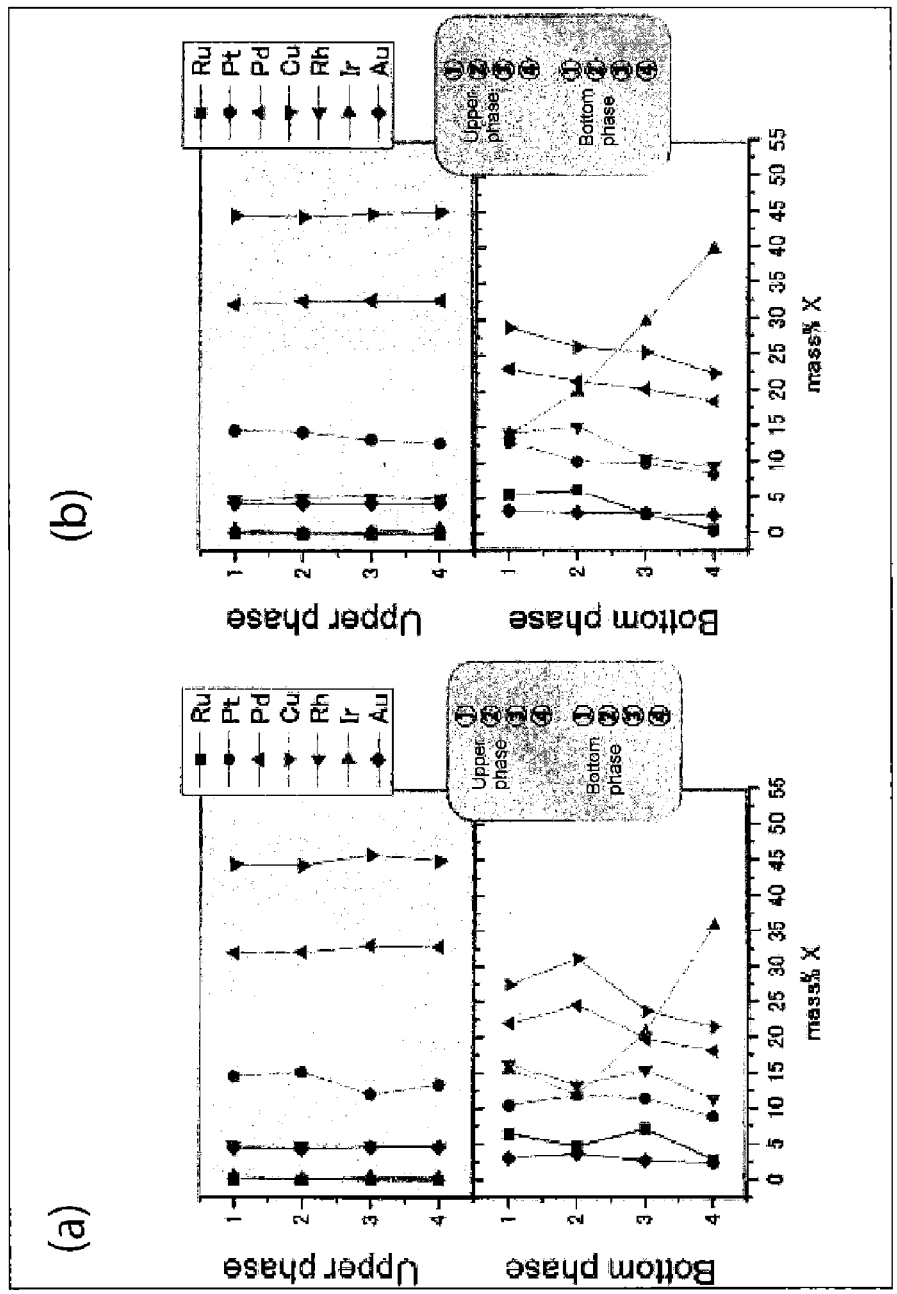
FIG. 8 is a view showing the element analysis result in the upper phase and the bottom phase, regarding the sample into which 10 mass % of Ir is added in this example, wherein the vertical axis indicates the depth from the outermost surface of the copper phase, and the horizontal axis indicates the mass % of the element. Further.

From FIG. 6 to FIG. 8 and tables 3 to 4, it is found that when Ir is added, the distribution ratio of Rh is improved. It is also found that by adding 5 mass % or more and less than 10 mass % of Ir, the distribution ratio of Pr, Pd, and Cu is also improved compared with the distribution ratio before adding Ir. Further, in these test results, 5 mass % case is a most preferable result.

Example 2

In example 2, as described in embodiment 2, explanation is given for the case of (2) further adding Cu. Note that regarding the part overlapped with example 1, explanation is omitted.

Figure 9:
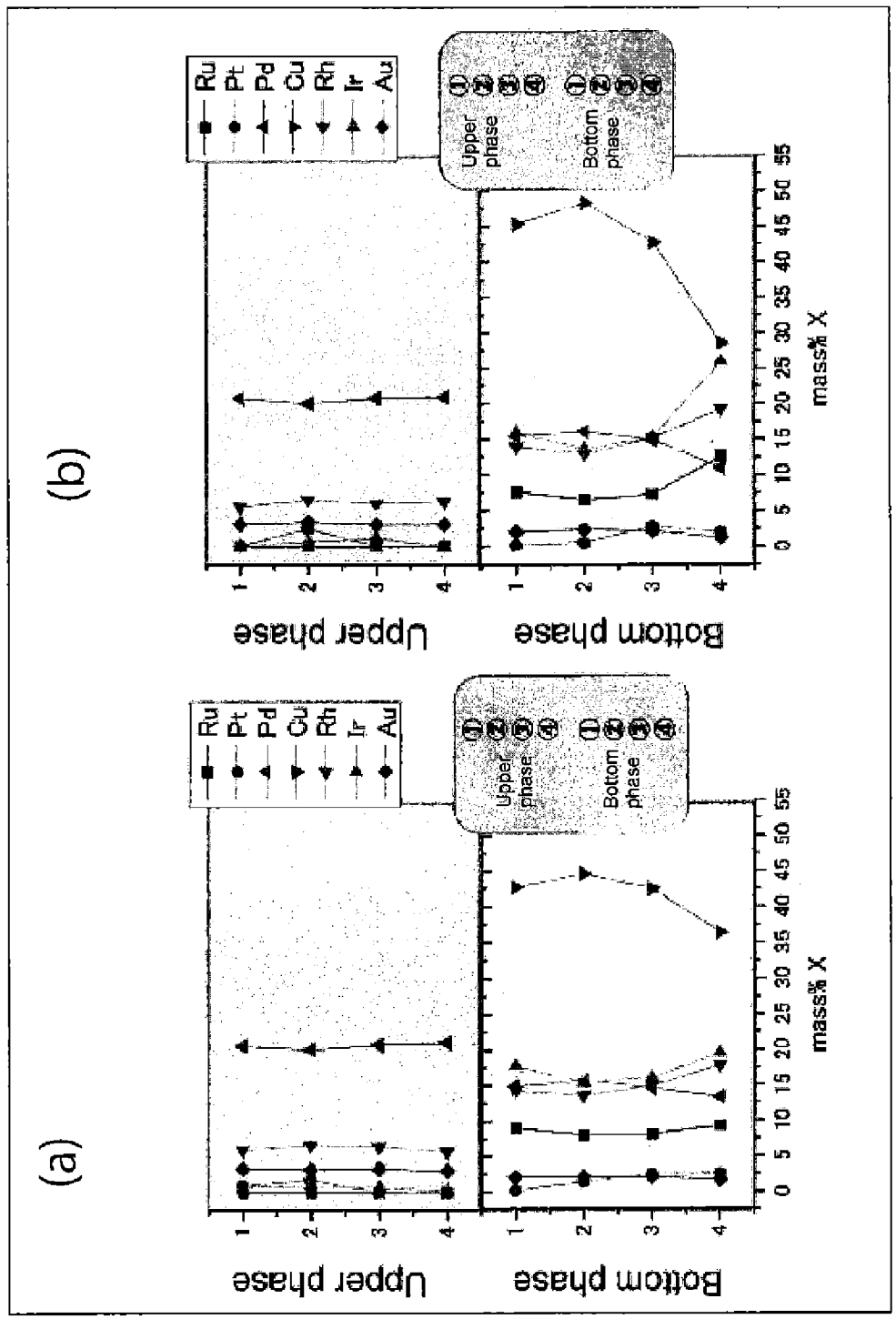
FIG. 9 is a view showing the element analysis result in the upper phase and the bottom phase, regarding the sample into which 50 mass % of Cu is added in this example, wherein the vertical axis indicates the depth from the outermost surface of the copper phase, and the horizontal axis indicates the mass % of the element. Further.

In this example, Cu was further added and mixed into the melted copper phase as described above. The mixing amount in this case was set to 50 mass % in the molten copper phase, to thereby fabricate the sample. Similarly to the copper phase before the test, this sample was also divided into the upper phase and the bottom phase, and the element in both phases was analyzed. FIG. 9 shows the result thereof, and FIG. 9(a) shows the result of the case that the melting time is set to 1 hour, and FIG. 9(b) shows the result of the case that the melting time is set to 3 hours. The vertical axis indicates the depth from the outermost surface from the copper phase, and the horizontal axis indicates the mass % of the element. Further, table 5 (melting time: 1 hour) and table 6 (melting time: 3 hours) show the relation between the distribution ratio ($L_x^{u/b}$) of each element and the mixing amount of Cu.

TABLE 5

| Cu addition amount (mass %) | $L_x^{u/b}$ | | | | | | |
|---|---|---|---|---|---|---|---|
| | Rh | Pt | Pd | Cu | Au | Ru | Ir |
| 0% | 0.26 | 1.25 | 1.46 | 1.71 | 1.56 | 0.0013 | 0.0004 |
| 50% | 0.41 | 0.41 | 1.42 | 1.66 | 1.72 | 0.0018 | 0.036 |

TABLE 6

| Cu addition amount (mass %) | $L_x^{u/b}$ | | | | | | |
|---|---|---|---|---|---|---|---|
| | Rh | Pt | Pd | Cu | Au | Ru | Ir |
| 0% | 0.27 | 1.28 | 1.43 | 1.62 | 1.46 | 0.0043 | <0.001 |
| 50% | 0.39 | 0.47 | 1.44 | 1.68 | 1.67 | 0.0051 | 0.027 |

Further, in this example, the element in the precipitation phase (solid phase) in this sample was also analyzed. Regarding the result thereof, FIG. 10 and table 7 show the relation in the case that the vertical axis indicates the mass % and the horizontal axis indicates the mass % of Cu in the upper phase.

TABLE 7

| Cu addition amount (mass %) | Melting time (h) | Mass % of Cu in the upper phase | Mass % in the precipitation phase (solid phase) | | | | | | |
|---|---|---|---|---|---|---|---|---|---|
| | | | Rh | Pt | Pd | Cu | Au | Ru | Ir |
| 0% | 3 | 40.91 | 32.79 | 10.41 | 8.62 | 2.42 | 0.57 | 18.24 | 26.96 |
| 50% | 1 | 68.87 | 26.79 | 3.99 | 4.20 | 2.04 | 0.11 | 26.52 | 36.35 |
| 50% | 3 | 69.14 | 30.49 | 3.44 | 4.63 | 2.09 | 0.12 | 20.48 | 38.74 |

Figure 10:
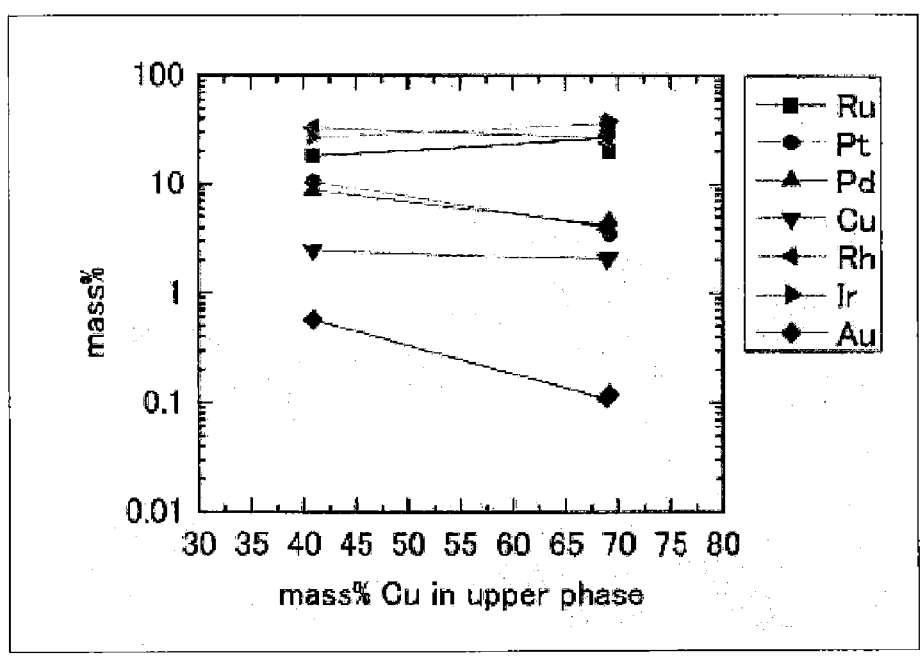
FIG. 10 is a view showing the relation between the mass % of the element in the precipitation phase (solid phase), and the mass % of Cu in the upper phase, regarding the sample into which 50 mass % of Cu is added in this example.

From FIG. 9 to FIG. 10 and tables 5 to 7, it is found that when Cu is further added, the distribution ratio of Rh and Au is improved. Meanwhile, it is found that Ru and Ir are unevenly distributed in the precipitation phase (bottom phase) compared with the composition of the metal copper before the test. Particularly, as shown in FIG. 10, it is found that Ir is unevenly distributed after charge of Cu, compared with a case before additionally charging Cu. Namely, Pt and Pd which were originally required to be recovered, were unevenly distributed in the upper phase, and meanwhile the other elements were unevenly distributed in the bottom phase, so that the distribution ratio of Pt and Pd could be increased.

Example 3

In example 3, as described in embodiment 3, explanation is given for the case of (3) further adding Mn. Note that the explanation for the part overlapped with example 1, is omitted.

In this example, Mn was further mixed into the melted metal copper as described above. The mixing amount in this case was set to 20 mass % in the molten copper phase, and the melting time was set to 3 hours, to thereby fabricate the sample. Similarly to the copper phase before the test, this sample was also divided into the upper phase and the bottom phase, and the element in both phases was analyzed. Regarding the result thereof, FIG. 11 and table 8 show the relation in which the vertical axis indicates the mass % and the horizontal axis indicates the mass % of Mn in the upper phase. Briefly speaking, FIG. 11 and table 8 show the difference of the composition of the element between before and after charge of Mn. The same thing can be said for the figure and table thereafter.

TABLE 8

| Mn addition amount (mass %) | Melting time (h) | Mass % of Mn in the upper phase | $L_x^{u/b}$ | | | | | | | |
|---|---|---|---|---|---|---|---|---|---|---|
| | | | Rh | Pt | Pd | Cu | Au | Ru | Ir | Mn |
| 0% | 3 | 0 | 0.269 | 1.276 | 1.425 | 1.620 | 1.461 | 0.004 | <0.001 | 0 |
| 20% | 3 | 15.37 | 0.821 | 1.484 | 1.439 | 1.544 | 1.479 | 0.005 | 0.130 | 1.314 |

Further, regarding the sample fabricated as described above, FIG. 12 and table 9 show the relation between the mass % of the element in the precipitation phase (solid phase) and the mass % of Mn in the upper phase. Note that FIG. 13 shows the difference of the element composition between before and after charge of Mn.

TABLE 9

| Mn addition amount (mass %) | Melting time (h) | Mass % of Mn in the upper phase | Mass % in the precipitation phase (solid phase) | | | | | | | |
|---|---|---|---|---|---|---|---|---|---|---|
| | | | Rh | Pt | Pd | Cu | Au | Ru | Ir | Mn |
| 0% | 3 | 0 | 32.79 | 10.41 | 8.62 | 2.42 | 0.57 | 18.24 | 26.96 | 0 |
| 20% | 3 | 15.38 | 15.18 | 2.10 | 1.59 | 1.11 | 0 | 35.05 | 41.83 | 3.14 |

Further, the analyzing sample of the metal copper fabricated as described above, was divided into both phases of the upper phase and the bottom phase, and regarding the relation between the mass % of the element and the melting time in both phases, FIG. 13(a) shows the upper phase, and FIG. 13(b) shows the bottom phase. Note that the horizontal axis indicates the "mass % of Mn in the upper phase" in both FIG. 13(a) and FIG. 13(b). The "bottom phase" in this example is in a state of including the precipitation phase (solid phase), and the element is analyzed in this state.

Figure 11:
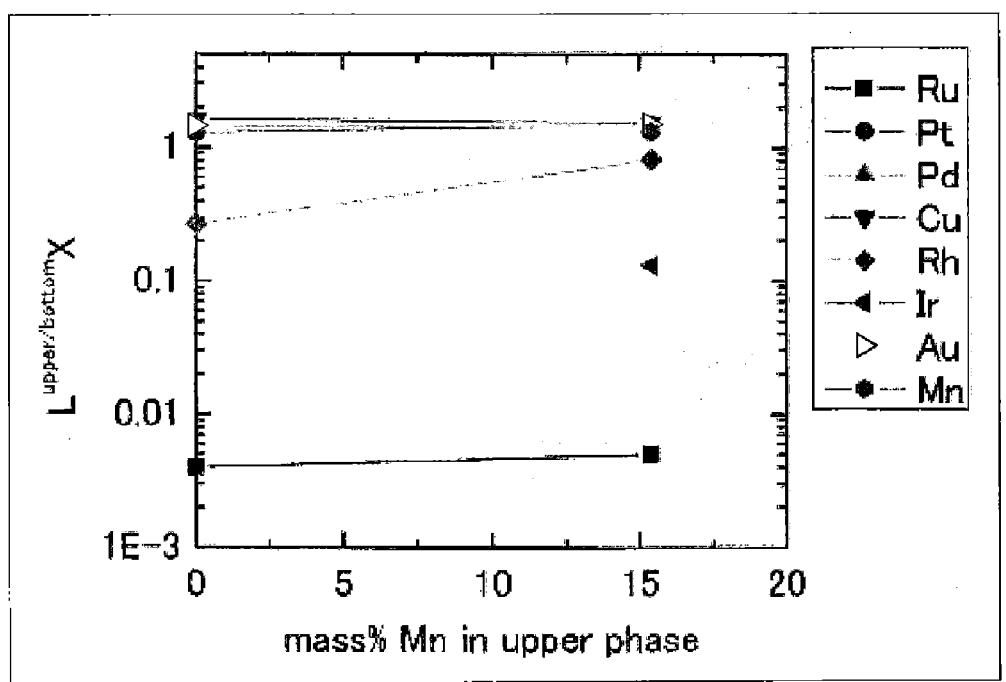
FIG. 11 is a view showing the relation between a distribution ratio and the mass % of Mn in the upper phase, regarding the sample into which 20 mass % of Mn is added in this example.
Figure 12:
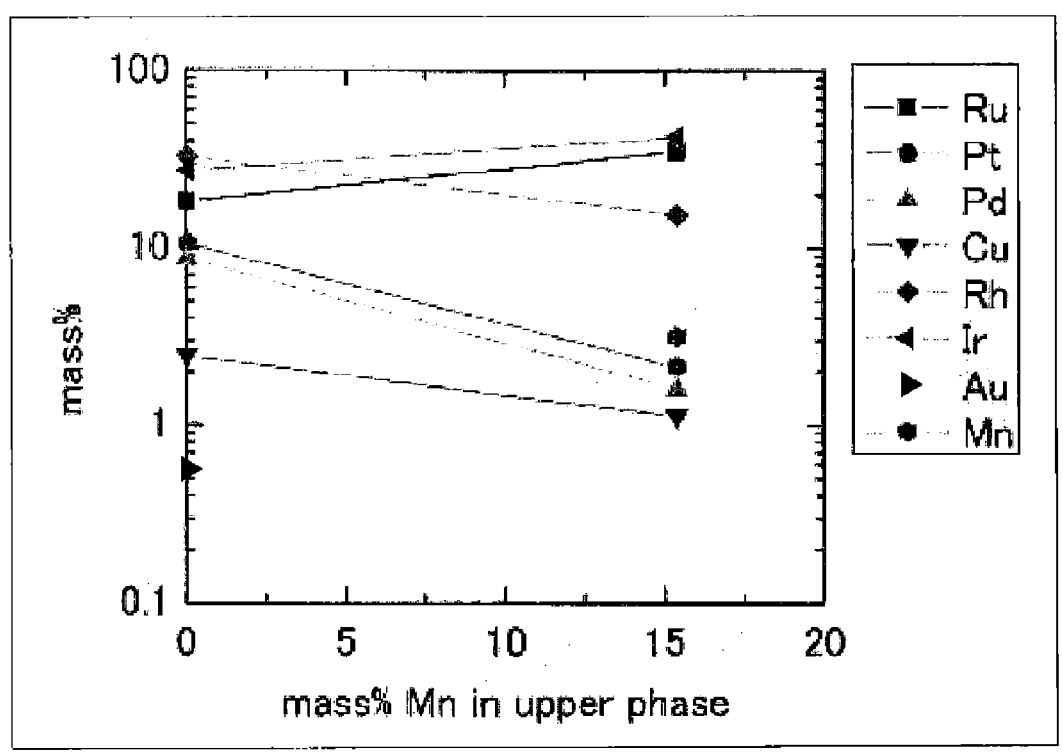
FIG. 12 is a view showing the relation between the mass % of the element in the precipitation phase (solid phase) and the mass % of Mn in the upper phase, regarding the sample into which 20 mass % of Mn is added in this example.
Figure 13:
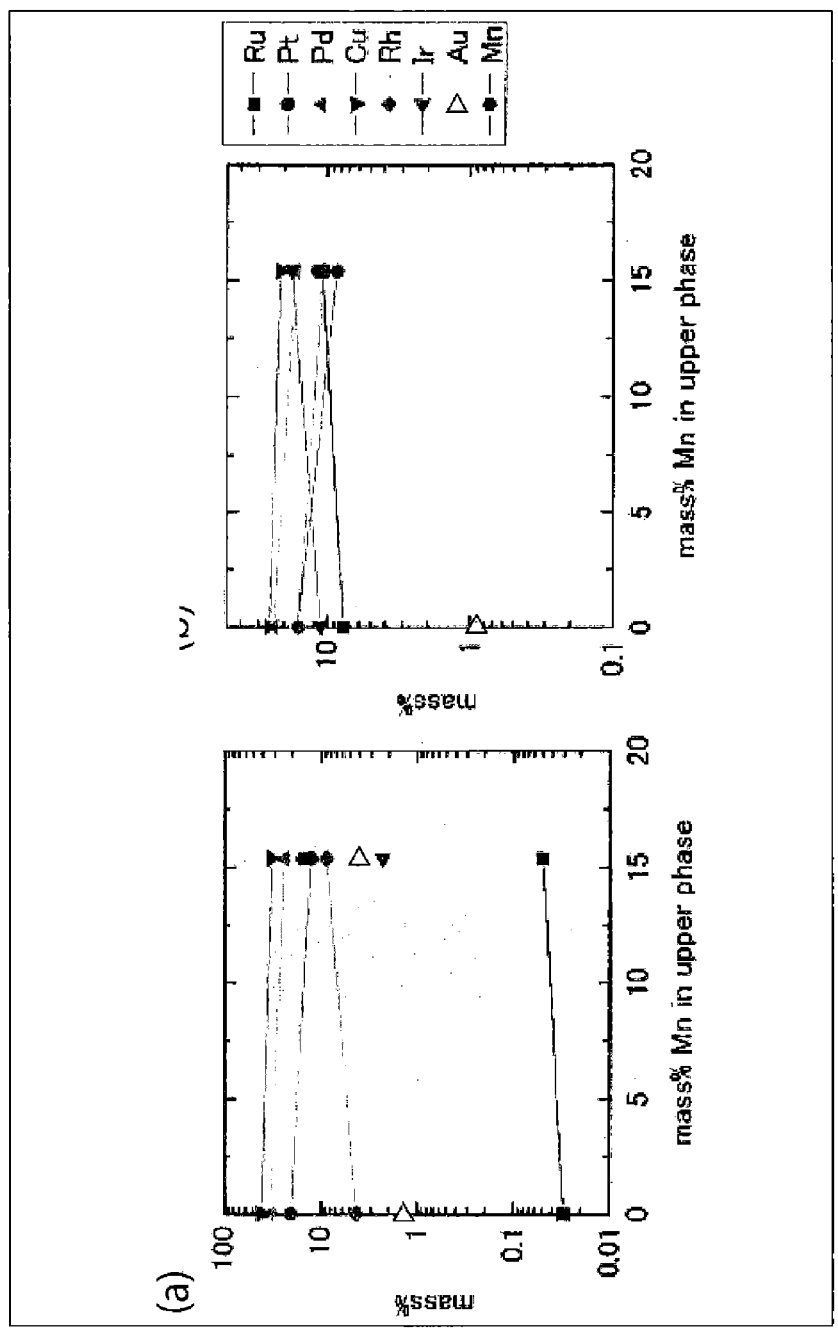

From FIG. 11 to FIG. 13 and tables 8 to 9, it is found that the distribution ratio of Pt, Pd, and Rh, and Au is improved, compared with the distribution ratio before charge of Mn (when the mass % of Mn is 0 in the upper phase). Meanwhile, it is also found that Ru and Ir are unevenly distributed in the precipitation phase (bottom phase) compared with the composition of the metal copper before the test. In addition, it is also found that contents of Pt, Pd, and Rh, and further Au are decreased in the precipitation phase (solid phase) compared with the content before adding Mn. Namely, Pt, Pd, and Rh, and further Au which were originally required to be recovered, were unevenly distributed in the upper phase while allowing the other elements to be unevenly distributed in the bottom phase, and in this state, the distribution ratio of Pt, Pd, and Rh, and further Au could be increased.

Preferable aspects of this embodiment are supplementarily described hereafter.

[Supplementary Description 1]

A method of recovering platinum group elements, including:

adding 5 mass % or more and less than 10 mass % of iridium to a molten copper phase containing platinum group elements, thereby increasing a distribution ratio of platinum, palladium, and copper in the copper phase, compared with the distribution ratio before adding the iridium.

[Supplementary Description 2]

A method of recovering platinum group elements or gold, including:

further adding copper to a molten copper phase containing platinum group elements, thereby further increasing a distribution ratio of gold compared with the distribution ratio before further adding the copper.

[Supplementary Description 3]

A method of recovering platinum group elements or gold, including:

adding manganese to a molten copper phase containing platinum group elements, thereby further increasing a distribution ratio of gold in a copper phase compared with the distribution ratio before adding the manganese.

[Supplementary Description 4]

A method of recovering platinum group elements, including:

adding manganese to a molten copper phase containing platinum group elements, thereby decreasing a content of platinum, palladium, and rhodium compared with the distribution ratio before adding the manganese, and increasing the distribution ratio of the platinum compared, palladium, and rhodium in a precipitation phase composed of a precipitate generated in the copper phase, compared with the distribution ratio before adding the manganese.

[Supplementary Description 5]

A method of recovering platinum group elements or gold, including:

adding manganese to a molten copper phase containing platinum group elements, thereby further decreasing gold in a precipitation phase composed of a precipitate generated in a copper phase, compared with adding the manganese, and increasing a distribution ratio of platinum, palladium, and rhodium.

[Supplementary Description 6]

A method of recovering platinum group elements, including:

adding iridium to a molten copper phase containing platinum group elements in a copper phase, thereby increasing a distribution ratio of rhodium compared with the distribution ratio before adding the iridium, wherein the platinum group elements are any one of six elements of ruthenium (Ru), rhodium (Rh), palladium (Pd), osmium (Os), iridium (Ir), and platinum (Pt), or a combination of them, and an upper phase indicates a phase on an outermost surface side of a plurality of phases formed according to a specific gravity of an element in the copper phase.

[Supplementary Description 7]

A method of recovering platinum group elements, including:

further adding copper to a molten copper phase containing platinum group elements, thereby increasing a distribution ratio of rhodium in a copper phase, compared with the distribution ratio before further adding copper, wherein the platinum group elements are anyone of six elements of ruthenium (Ru), rhodium (Rh), palladium (Pd), osmium (Os), iridium (Ir), and platinum (Pt), or a combination of them, and an upper phase indicates a phase on an outermost surface side of a plurality of phases formed according to a specific gravity of an element in the copper phase.

[Supplementary Description 8]

A method of recovering platinum group elements, including:

further adding manganese to a molten copper phase containing platinum group elements, thereby increasing a distribution ratio of platinum, palladium, and rhodium in a copper phase, compared with the distribution ratio before adding manganese, wherein the platinum group elements are any one of six elements of ruthenium (Ru), rhodium (Rh), palladium (Pd), osmium (Os), iridium (Ir), and platinum (Pt), or a combination of them, and an upper phase indicates a phase on an outermost surface side of a plurality of phases formed according to a specific gravity of an element in the copper phase.

DESCRIPTION OF SIGNS AND NUMERALS

1 Melting furnace
2 Electric furnace
3 Reaction tube
31 Outside tube
32 Inside tube
4 Crucible
5 Gas introducing part
51 Suction part
52 Molten copper phase
6 Molten copper phase

The invention claimed is:

1. A method of recovering platinum group elements, comprising:
adding copper into a molten copper phase containing platinum group elements including at least rhodium, thereby increasing a content of the rhodium in an upper phase of the molten copper phase; and
recovering the platinum group elements including the rhodium from the upper phase.

2. The method of recovering platinum group elements according to claim 1, comprising:
further adding iridium into the molten copper phase to which the copper is further added, and moving the iridium to a bottom phase of the molten copper phase, thereby increasing the content of the rhodium in the upper phase of the molten copper phase; and
recovering the platinum group elements including the rhodium from the upper phase.

3. The method of recovering platinum group elements according to claim 2, wherein the recovered platinum group element is rhodium.

4. The method of recovering platinum group elements according to claim 1, comprising:
further adding manganese into the molten copper phase to which the copper is further added, thereby increasing the content of the rhodium in the upper phase; and
recovering the platinum group elements including the rhodium from the upper phase.

5. The method of recovering platinum group elements according to claim 4, wherein the recovered platinum group element is rhodium and at least one of platinum and palladium.

6. The method of recovering platinum group elements according to claim 1, wherein the recovered platinum group element is rhodium.

7. A method of recovering platinum group elements, comprising:
adding iridium into a molten copper phase containing platinum group elements including at least rhodium, and moving the iridium to a bottom phase of the molten copper phase, thereby
increasing a content of the rhodium in an upper phase of the molten copper phase; and
recovering the platinum group elements including the rhodium from the upper phase.

8. The method of recovering platinum group elements according to claim 7, wherein the recovered platinum group element is rhodium.

9. A method of recovering platinum group elements, comprising:
adding manganese into a molten copper phase containing platinum group elements including at least rhodium, thereby
increasing a content of the rhodium in an upper phase of the molten copper phase; and
recovering the platinum group elements including the rhodium from the upper phase.

10. The method of recovering platinum group elements according to claim 9, wherein the recovered platinum group element is rhodium and at least one of platinum and palladium.

11. A method of recovering platinum group elements, comprising:
adding manganese into a molten copper phase containing platinum group elements including rhodium and at least one of platinum and palladium, thereby
increasing a content of the rhodium and at least one of the platinum and the palladium in an upper phase of the molten copper phase; and
recovering the platinum group elements from the upper phase.

12. The method of recovering platinum group elements according to claim 11, wherein the recovered platinum group element is rhodium and at least one of platinum and palladium.

* * * * *